US009113217B2

(12) United States Patent
Mallinson

(10) Patent No.: US 9,113,217 B2
(45) Date of Patent: *Aug. 18, 2015

(54) MEDIA FINGERPRINTING FOR SOCIAL NETWORKING

(71) Applicant: Sony Computer Entertainment Inc., Minato-ku (JP)

(72) Inventor: Dominic S. Mallinson, Redwood City, CA (US)

(73) Assignee: SONY COMPUTER ENTERTAINMENT INC., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/505,222

(22) Filed: Oct. 2, 2014

(65) Prior Publication Data

US 2015/0026716 A1 Jan. 22, 2015

Related U.S. Application Data

(63) Continuation of application No. 14/032,080, filed on Sep. 19, 2013, now Pat. No. 8,874,575, which is a continuation of application No. 12/753,001, filed on Apr. 1, 2010, now Pat. No. 8,560,583.

(51) Int. Cl.
*G06F 17/30* (2006.01)
*G06F 17/00* (2006.01)
(Continued)

(52) U.S. Cl.
CPC .......... *H04N 21/4788* (2013.01); *G06F 17/301* (2013.01); *G06F 17/30026* (2013.01);
(Continued)

(58) Field of Classification Search
CPC ................... G06F 17/30026; G06F 17/30029; G06F 17/30038; G06F 17/301; G06Q 30/0241; G06Q 50/01; H04N 21/812

USPC ......... 707/601, 702, 705, 758, 802, 913, 919, 707/736; 705/14.4, 319
See application file for complete search history.

(56) References Cited

U.S. PATENT DOCUMENTS 4,787,051 A 11/1988 Olson
4,843,568 A 6/1989 Krueger
(Continued)

FOREIGN PATENT DOCUMENTS

EP 1053642 11/2000
EP 2 180 652 A1 4/2010
(Continued)

OTHER PUBLICATIONS

Bolt, R.A., "Put-that-there": voice and gesture at the graphics interface , Computer Graphics, vol. 14, No. 3, (ACM SIGGRAPH Conference Proceedings) Jul. 1980, pp. 262 270.
(Continued)

*Primary Examiner* — Cheryl Lewis
(74) *Attorney, Agent, or Firm* — Kilpatrick Townsend & Stockton LLP

(57) ABSTRACT

Audio fingerprinting and other media matching technologies can be used to identify media, such as movies, television shows, and radio broadcasts. A user device can record image, audio, and/or video information and upload information to a matching service that is able to use matching technology to identify the media and provide supplemental content or information to the user. The user then can share this information with other users, such as by uploading to a social networking site or passing the information to peers on a peer network as part of a container. Users can have the ability to add tagged content, provide comments and ratings, and otherwise interact based at least in part upon the tagged media content.

20 Claims, 6 Drawing Sheets

(51) Int. Cl.
  *G06Q 30/02* (2012.01)
  *H04N 21/4788* (2011.01)
  *H04N 21/81* (2011.01)
  *G06Q 50/00* (2012.01)

(52) U.S. Cl.
  CPC .... *G06F17/30029* (2013.01); *G06F 17/30038* (2013.01); *G06F 17/30047* (2013.01); *G06Q 30/02* (2013.01); *H04N 21/812* (2013.01); *G06Q 50/01* (2013.01)

(56) References Cited

U.S. PATENT DOCUMENTS

| | | | |
|---|---|---|---|
| 5,128,671 | A | 7/1992 | Thomas, Jr. |
| 5,528,265 | A | 6/1996 | Harrison |
| 5,929,849 | A | 7/1999 | Kikinis |
| 6,157,368 | A | 12/2000 | Faeger |
| 6,247,022 | B1 | 6/2001 | Yankowski |
| 6,375,572 | B1 | 4/2002 | Masuyama |
| 7,200,857 | B1 | 4/2007 | Rodriguez et al. |
| 7,549,052 | B2 | 6/2009 | Haitsma et al. |
| 7,581,034 | B2 | 8/2009 | Polivy et al. |
| 7,599,580 | B2 | 10/2009 | King et al. |
| 7,898,504 | B2 | 3/2011 | Fischer |
| 8,188,969 | B2 | 5/2012 | Morin et al. |
| 8,253,649 | B2 | 8/2012 | Imai et al. |
| 8,560,583 | B2 * | 10/2013 | Mallinson ............... 705/14.4 |
| 8,838,671 | B2 | 9/2014 | Wies et al. |
| 8,874,575 | B2 * | 10/2014 | Mallinson ............... 707/736 |
| 2002/0028000 | A1 | 3/2002 | Conwell et al. |
| 2002/0059604 | A1 | 5/2002 | Papagan |
| 2002/0085097 | A1 | 7/2002 | Colmenarez et al. |
| 2002/0140855 | A1 | 10/2002 | Hayes |
| 2002/0186676 | A1 | 12/2002 | Milley et al. |
| 2003/0093790 | A1 | 5/2003 | Logan et al. |
| 2003/0152366 | A1 | 8/2003 | Kanazawa et al. |
| 2003/0156144 | A1 | 8/2003 | Morita |
| 2003/0171096 | A1 | 9/2003 | Ilan et al. |
| 2003/0212762 | A1 | 11/2003 | Barnes et al. |
| 2004/0001161 | A1 | 1/2004 | Herley |
| 2004/0210824 | A1 | 10/2004 | Shoff et al. |
| 2004/0212589 | A1 | 10/2004 | Hall et al. |
| 2005/0005308 | A1 | 1/2005 | Logan et al. |
| 2005/0108026 | A1 | 5/2005 | Brierre |
| 2005/0123267 | A1 | 6/2005 | Tsumagari |
| 2005/0193425 | A1 | 9/2005 | Sull et al. |
| 2005/0220439 | A1 | 10/2005 | Carton et al. |
| 2005/0227674 | A1 | 10/2005 | Kopra et al. |
| 2006/0038833 | A1 | 2/2006 | Mallinson et al. |
| 2006/0184960 | A1 | 8/2006 | Horton et al. |
| 2007/0106551 | A1 | 5/2007 | McGucken |
| 2007/0136773 | A1 | 6/2007 | O'Neil et al. |
| 2007/0143777 | A1 | 6/2007 | Wang et al. |
| 2007/0169115 | A1 | 7/2007 | Ko et al. |
| 2007/0250716 | A1 | 10/2007 | Brunk et al. |
| 2008/0215679 | A1 | 9/2008 | Gillo et al. |
| 2008/0226119 | A1 | 9/2008 | Candelore et al. |
| 2008/0246694 | A1 | 10/2008 | Fischer |
| 2008/0275763 | A1 | 11/2008 | Tran et al. |
| 2008/0276278 | A1 | 11/2008 | Krieger et al. |
| 2009/0037975 | A1 | 2/2009 | Ishikawa et al. |
| 2009/0055383 | A1 | 2/2009 | Zalewski |
| 2009/0123025 | A1 | 5/2009 | Deng et al. |
| 2009/0154806 | A1 | 6/2009 | Chang et al. |
| 2009/0228921 | A1 | 9/2009 | Miki et al. |
| 2009/0327894 | A1 | 12/2009 | Rakib et al. |
| 2010/0007050 | A1 | 1/2010 | Kagawa et al. |
| 2010/0100581 | A1 | 4/2010 | Landow et al. |
| 2010/0119208 | A1 | 5/2010 | Davis et al. |
| 2010/0222102 | A1 | 9/2010 | Rodriguez |
| 2010/0257252 | A1 | 10/2010 | Dougherty et al. |
| 2010/0275235 | A1 | 10/2010 | Joo et al. |
| 2010/0318484 | A1 | 12/2010 | Huberman et al. |
| 2011/0053642 | A1 | 3/2011 | Lee |
| 2011/0071838 | A1 | 3/2011 | Li-Chun Wang et al. |
| 2011/0078729 | A1 | 3/2011 | LaJoie et al. |
| 2011/0103763 | A1 | 5/2011 | Tse et al. |
| 2011/0246495 | A1 | 10/2011 | Mallinson |

FOREIGN PATENT DOCUMENTS

| | | |
|---|---|---|
| JP | P2000-242661 A | 9/2000 |
| JP | P2001-036875 A | 2/2001 |
| JP | P2002-118817 A | 4/2002 |
| JP | P2002-198840 A | 7/2002 |
| JP | 2005-532578 A | 10/2005 |
| JP | P2007-088801 A | 4/2007 |
| JP | 2008-0101075 A | 11/2008 |
| JP | 2008-283344 | 11/2008 |
| JP | P2009-033769 A | 2/2009 |
| JP | 2009-0043526 A | 5/2009 |
| WO | 2004/004351 | 1/2004 |
| WO | 2004/034281 | 4/2004 |
| WO | 2005/006610 A1 | 1/2005 |
| WO | 2007/064641 A2 | 6/2007 |
| WO | 2008/024723 A2 | 2/2008 |
| WO | 2008/056180 A2 | 5/2008 |
| WO | 2009/032707 A1 | 3/2009 |
| WO | 2009/036435 A1 | 3/2009 |
| WO | 2010/020739 A1 | 2/2010 |

OTHER PUBLICATIONS

DeWitt, Thomas and Edelstein, Phil, "Pantomation: A System for Position Tracking," Proceedings of the 2$^{nd}$ Symposium on Small Computers in the Arts, Oct. 1982, pp. 61-69.

Mark Toner, Abstract of dissertation provided by Mr. Toner and purported to be maintained at Liverpool University, 1 page.

Tanaka et al., JP 2008-210683 article, Japanese language, PW080056, vol. 97, No. 1, Feb. 4, 1997, Information Processing Society of Japan, pp. 1-5.

Tanaka et al., Partial Translation of Ref., "Interactive Video Navigation System by Using the Media Fusion Technique of Video/TV and World Wide Web," Information Processing Society of Japan, Feb. 4, 1997, pp. 3-4.

Mohan et al., "Bokode: Imperceptible Visual tags for Camera Based Interaction from a Distance," ACM Transactions on Graphics, Jul. 2009, vol. 28(3), Article No. 98, pp. 1-2.

* cited by examiner

MEDIA FINGERPRINTING FOR SOCIAL NETWORKING

CROSS-REFERENCES TO RELATED APPLICATIONS

This application is a continuation of U.S. application Ser. No. 14/032,080, filed Sep. 19, 2013, now U.S. Pat. No. 8,874,575, which is a continuation of U.S. application Ser. No. 12/753,001, filed Apr. 1, 2010, now U.S. Pat. No. 8,560,583, entitled "Media Fingerprinting for Social Networking," the contents of which are hereby incorporated by reference in their entireties for all purposes.

This application is related to U.S. patent application Ser. No. 12/752,979, filed Apr. 1, 2010, entitled "Media Fingerprinting for Content Determination and Retrieval," which is hereby incorporated herein by reference in their entireties for all purposes.

BACKGROUND

Today's consumers are exposed to increasing varieties and amounts of information from an increasing number of sources. Many times, a consumer will have a television or other source of information playing in the background while performing another activity, such as reading an electronic book, texting a friend, or playing a game on a handheld device. Other times, a user may simply be walking back in forth from a room in which audio or video content is being played. Since the user is not paying complete attention to the media being played, the user might only return his or her attention to the media when there is something of interest presented, such as a commercial, intense action scene, song of interest, etc. If the user was not paying attention to the media, the user might not know exactly what it going on. In the case of a commercial, for example, the user might turn his or her attention to the commercial towards the end of the commercial when it is too late to determine the product or service being advertised.

In other cases, a user might be focusing his or her primary attention on an audio or video presentation, but might want to determine information pertaining to that presentation. For example, if a commercial for an item is on the screen then the user might want to find out other information about that item, such as where the item is sold or how much the item costs. If a user is watching a movie, the user might want to know the name of the actor in the current scene, where the scene takes place, or what type of shirt the main actor is wearing. While a user can attempt to locate the information by performing a Web search or using other such approaches, the consumer often will not have a paper and writing instrument available to take the necessary notes, and might not have enough detailed information to write down anyway. If the consumer is not able to take notes right away, the consumer might forget details about the presentation, or even what was interesting in the presentation in the first place.

Further, there is no existing way for users to quickly and easily share this information with their friends or other users. Even if a user is able to determine an identify of a movie of interest, for example, there is no easy way for a user to point his or her friends to a particularly funny scene or other portion of interest. A user can always search for information and attempt to direct others to that portion of content, but the amount of work necessary will generally prevent most users from providing more than general comments about the content.

BRIEF SUMMARY

Systems and method in accordance with various embodiments address at least some of these and other deficiencies in conventional approaches to identifying, locating, and/or accessing supplemental content or relevant information pertaining to media presentations, as well as approaches to sharing such content or information once identified. In particular, various embodiments enable a user to capture information about a media presentation, such as by recording an audio and/or video segment of the presentation using an appropriate user device. The media presentation can be any appropriate presentation, such as a live television broadcast, an on-demand movie, video content rendered from a physical medium, etc. The user can cause a request to be submitted to a remote system or service, for example, to attempt to identify or obtain additional information about at least one aspect of the video presentation.

For example, a user might capture information about a commercial for a particular product. In response, a system identifying the commercial can send the user information such as product information, specifications, or pricing, as well as links to a manufacturer website or a location where the user can purchase the product. In another example, a user might capture information about a scene in a movie. In response, a system identifying the movie can send the user information such as the title and year of the movie, actor information, information about products in that scene, or other such information. The system can also provide the user with the ability to obtain a copy of the movie, such as providing a link to the movie or pushing a version of the movie to an identified device. Various other examples are described below in relation with the various embodiments.

Once a user has obtained the information, the user can share that information with other users. In some embodiments, the user can upload this information to a Web site, such as a social networking site, where users can post information of interest. In some embodiments, these sites relate to particular types or instances of content, and users can upload, tag, link, review, and/or comment on various content of those types or instances.

In other embodiments, peers on a peer network or other friends or group members can share information by passing a container or sharing contents of another virtual component that contains information of interest to that group. For example, peers can share video and audio clips that those users found to be of interest. Each peer can have the ability to provide comments or reviews of the content, and add content of their own.

Various other aspects and approaches should be apparent to one of ordinary skill in the art in light of the teachings and suggestions contained herein.

BRIEF DESCRIPTION OF THE DRAWINGS

Various embodiments in accordance with the present disclosure will be described with reference to the drawings, in which.

DETAILED DESCRIPTION

Systems and method in accordance with various embodiments provide for the identifying, locating, and/or accessing or supplemental content relating to media presentations. Users are able to share this information with other users in a number of different ways as described herein. In particular, approaches in accordance with the various embodiments utilize a process such as video and/or audio fingerprinting to identify content being presented through at least one electronic device. A user can record, capture, or otherwise store audio, image, and/or video information that can be used to determine at least an identity of a specified piece of media. Based at least in part upon this information, a user "tagging" a particular instance of media content can receive any of a number of types of information or content relating to that media. The user then can share this information with others, such as by uploading tagged content to a social networking site or sharing with peers over a peer network.

Figure 1:
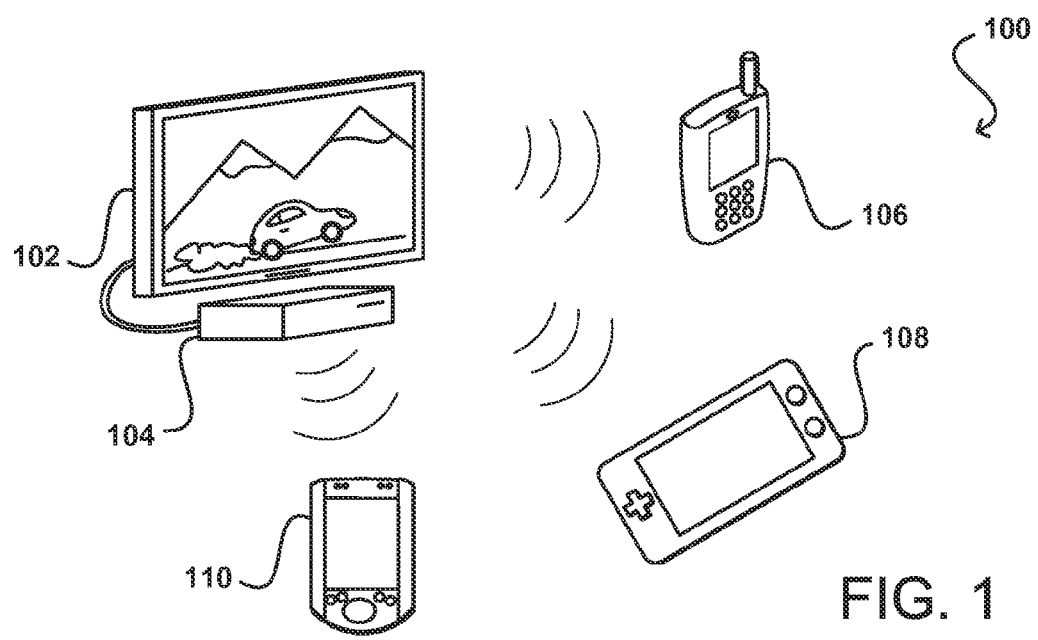
FIG. 1 illustrates a variety of user devices that can be utilized in accordance with various embodiments.

FIG. 1 illustrates an example environment 100 wherein a consumer is watching a video program displayed on a display device 102, such as a television, computer monitor, or video screen, among others. The display device 102 typically will provide a video image as well as a corresponding audio signal, although other devices can be utilized that only utilize still images, audio, or video content. The consumer might have any of a number of other electronic devices within an audible or viewing range of the display device 102, such as at least one stationary component 104 connected to the display device, such as a video player, gaming system, or set top box. Further, the consumer might have devices such as a cell phone 106, portable gaming device 108, personal data assistant (PDA) 110, or any of a number of other such computing or electronic devices.

At least one of these electronic devices can have the ability to capture information about the media being presented through the display device 102. For example, an electronic device might have a video camera operable to capture a video segment, or at least one or two frames, of content displayed on the display device. Another device might have digital recording circuitry such that the device can capture audio information corresponding to the presented media over at least a minimum period of time, such as at least 2, 5, or 10 seconds. For directly connected devices, the audio feed can be directly (via analog to digital (A2D) or pure digital) monitored by a module or application of the device. For portable devices, a microphone or other such media capturing element can periodically, continually, or at selected times sample or capture the audio (and/or video or images) of the broadcast. The electronic device can also include at least one output mechanism, such as a network connection or output port, enabling the electronic device to provide information about the captured content to an external system or service.

Figure 2:
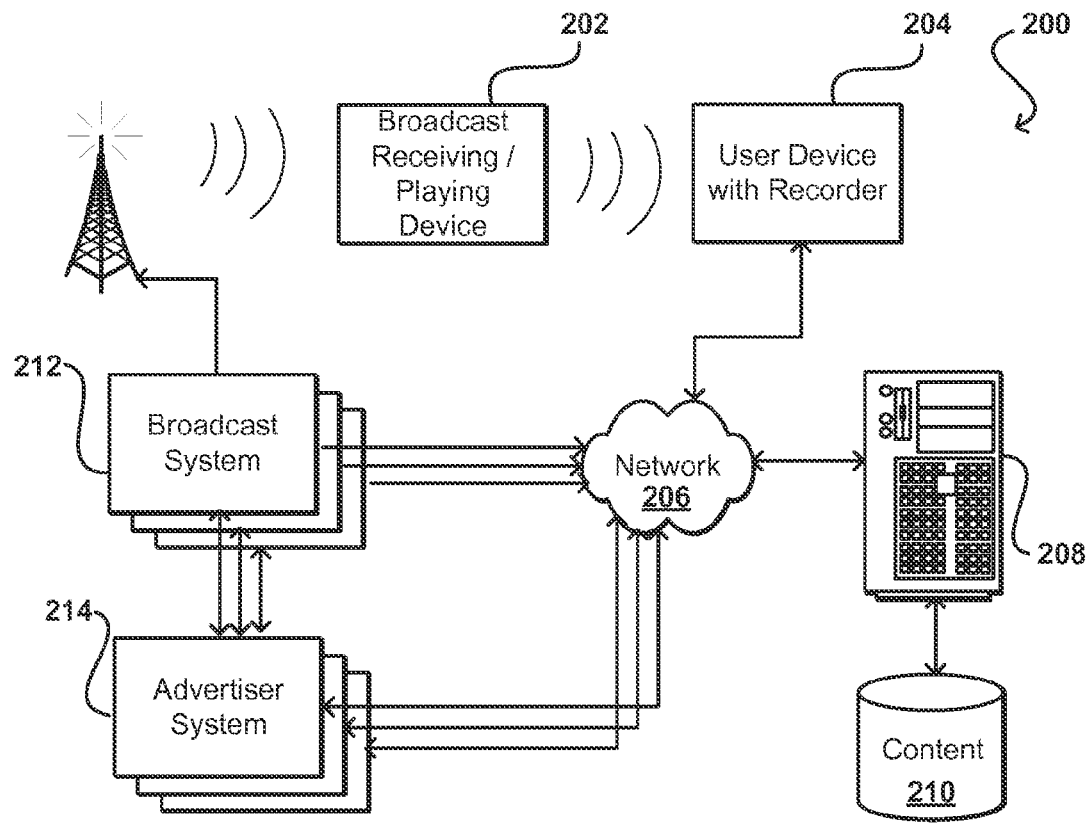
FIG. 2 illustrates an environment in which various embodiments can be implemented.

For example, consider the environment 200 of FIG. 2. In this example, the user device is able to connect to a remote server 208 (or other such system, service, or device) via a connection to at least one network. The network can be any appropriate network or combination of networks, such as a cellular network, broadband network, an intranet, the Internet, a private peer-to-peer network, etc. The user device 204 can be connected to the network using a direct network connection, such as a cellular or Wi-Fi connection, or can connect to the network via one or more intermediate devices, such as a docking station or home computer. The user device 204 can cause information about the captured content to be uploaded to the remote server, whereby the server can attempt to match the information against information stored in at least one data repository 210 or other such storage location. As should be understood, there can be one or more servers at different levels connecting to one or more data sources, such as a web server, application server, and/or search server connecting to at least one database to obtain information for the content and/or the consumer. In addition to at least one server 208 and at least one database 210, a supplemental content provider, media matching service, or other such entity can utilize any of a number of additional components and applications known or subsequently developed for such purposes. For example, a matching service can be configured to receive Web service requests, which are received by at least one router and/or Web server to direct each request to an application server or other such component for processing each request. At least one application server can execute instructions to provide at least one module, such as a recognition module or other such component, for identifying content, such as advertising, and selecting corresponding supplemental content, such as additional advertising or product information.

In various embodiments, a content provider such as a broadcaster 212 or an advertiser 214 can provide information about specific instances of content, which can be parsed, analyzed, or otherwise processed as discussed elsewhere herein and stored to a database 210 for subsequent content matching and other such purposes. The advertiser 214 (and any other appropriate content provider) also can provide information to the various broadcast systems 212, or other such broadcasting entities, which can cause the content to be broadcast (as a commercial or as product placement within or overlaying programming) or otherwise transmitted and received by the broadcast receiving and/or playing device 202. Any appropriate components or systems can be used for the purposes of transmitting and/or receiving broadcast signals as known or subsequently developed in the art. The broadcast receiving and/or playing device can include one or more components operable to receive and decode the broadcast signal, as well as to display or otherwise convey the content. Such a device can include at least one of a set top box, television, satellite receiver, analog or digital audio receiver, radio, video game console, media player, or other such component. Further, while an over-the-air broadcast example is shown, it should be understood that any other broadcasting approach such as digital cable, radio waves, or satellite communications can be used as well within the scope of the various embodiments. Any broadcast of content such as video, television, or radio broadcasts of any type can be used in accordance with various embodiments.

If a match is located, information corresponding to the match can be transmitted to the user. In embodiments where the user captures the information with a computing device such as a smart phone, information such as the identity of the content can be transmitted to the device itself, such that the user can obtain the information on the same device that was used to capture the content. In other embodiments, the information might be sent to another device by the user, as might be specified by the user or otherwise determined. For example, a user might capture the content with a cell phone, but wish to receive results via email or another appropriate mechanism to a home computer, whereby the user can access information such as related websites, product pages, etc. In other embodiments, the information might be transmitted to a cable box or digital video recorder (DVR) to schedule a recording of the next occurrence of that program for the user. In still other embodiments, the user might have the information transmitted to a gaming console, portable media player, or other such electronic device that is able to download or otherwise access specific content corresponding to the identified media. In some embodiments, the user can select the device to receive the content at approximately the time that the information is captured and/or uploaded for analysis. For example, a user interested in a program being displayed might cause the results to be sent to a DVR, whereby the DVR can automatically record the next instance of that program, while a user interested in a shirt an actor in the program is wearing might cause the information to be sent to a home computer, whereby the user can follow or select certain information about the content. The user also can specify, in some embodiments, the type of information to be retrieved, such as a copy of the content, information about a product being displayed, actor or other program-specific information, etc. Any appropriate interface for selecting such information can be used as would be apparent to one of ordinary skill in the art in light of the teachings and suggestions contained herein.

In one example of matching content captured by a user, the captured media file (e.g., audio, video, and/or one or more images) or information corresponding to the captured media file is received to a system or service capable of analyzing the received media file to extract or generate hash values or other such identifying characteristics. Information for the analyzed media file (e.g., hash information) is compared against comparable information stored in at least one database or other such location. In certain embodiments, an audio fingerprinting process is used to compare audio information captured by the user with audio information stored in the database. Whether the user captured audio and video or image content, or audio content alone, for example, the audio portion can be analyzed to attempt to determine the content that was captured by the user. Approaches to audio fingerprinting are described, for example, in U.S. Pat. No. 7,549,052, issued Jun. 16, 2009, entitled "Generating and Matching Hashes of Multimedia Content," which is hereby incorporated herein by reference. If a match is located using the database, corresponding content (referred to herein as "supplemental content") can be determined and/or located for the matching content. For example, if the captured content is determined to be a commercial for a product, the supplemental content can include information such as a name of the product and/or manufacturer, a digital copy of the commercial, a link or other navigational element to locate information for the advertisement (e.g., a website for the product), or other such content. If the captured content corresponds to a television program, the supplemental content can include information such as identities of the actors or locations included in the program, a location to access or download a version of the program, etc. Various other types of supplemental content can be provided as well as discussed or suggested elsewhere herein. Any located supplemental content can then be provided to at least one designated device or location, such as by sending information to the requesting user device, sending a version of the program to an identified media player or other such device, generating a page of information and providing a link accessible by a user, etc. In some embodiments, the user can identify or otherwise selection the type of supplemental content to be received, a location to send the content, and other such information.

If no match is located in the database, at least within a threshold level of confidence or other such matching accuracy criterion, information in the captured media file can be further processed in an attempt to locate useful information. For example, the captured content can be analyzed using voice or image recognition, optical character recognition (OCR), or any other appropriate approach discussed elsewhere herein in an attempt to determine any useful aspect of the captured content. For example, an OCR process can automatically detect the presence of a web address (e.g., a URL) in a commercial, and can at least provide the web address or a link to the user whether or not the system can otherwise match the content. If useful information is located, that information can be provided to the user in any of the ways discussed above, such as to send any information about the content to the user. For example, the system might not be able to exactly match a commercial, but based on closed captioning content and image recognition might be able to determine that the content was a commercial for a particular type of shoe, and can provide at least that much information to the user. In some embodiments, this information can be fed back into the image matching algorithm to attempt to increase the confidence score of at least one of the results. For example, there can be longer and shorter versions of the same commercial that might not initially match within a given confidence level, but based at least in part upon the additional determined information the confidence score might be increased such that a likely match can be determined. If no useful information can be determined, or if the useful information does not result in finding at least one match, the information for the captured content can be stored for subsequent analysis, such as after a broadcaster provides another batch of content or after the system has a period of time to build information in the database, etc. In some examples, the user might record content corresponding to a live broadcast, such as of a sporting event or other real-time performance. In such an instance, as may be determined at least in part upon the channel and/or timestamp provided with the captured information, the matching service might store the information in a special queue or other location until the system is able to analyze the broadcast and provide appropriate matching information and/or supplemental content. The system also can use other information, such as the IP address or other location-related information, in order to attempt to narrow the search window with respect to broadcasts in a certain area (such as for a local sporting team). Other approaches and additional information for determining matching content are described in U.S. patent application Ser. No. 12/752,979, filed Apr. 1, 2010, entitled "Media Fingerprinting for Content Determination and Retrieval," which is hereby incorporated herein by reference.

Figure 3:
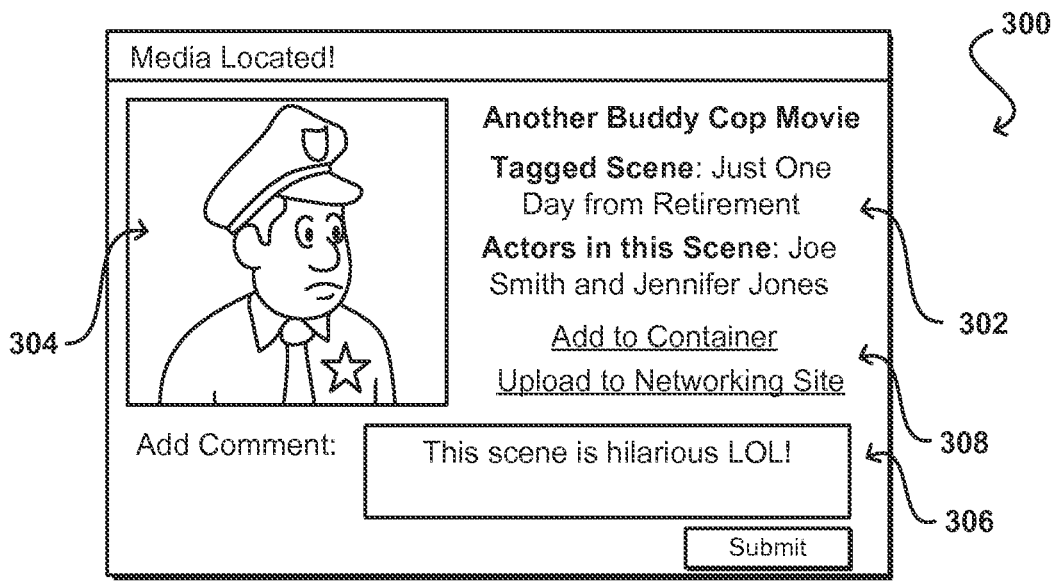
FIG. 3 illustrates an example display for matching content information that can be provided to a user accordance with one embodiment.

FIG. 3 illustrates an example interface 300 that might be presented to a user of a computing device upon a match being located for a captured media file. In this example, the media file was matched to a particular scene of a movie, although other information identifying a portion of a media file can be used as well. In this example, information 302 including (and in addition to) identifying information is presented to the user. This display includes the title, identity of the scene from which the media file was captured, the identities of actors in that scene, and an image or video file 304 corresponding to that scene. The selection and type of information can vary among embodiments, and can be configurable by different users.

As illustrated, the information can include a digital copy (or link to a digital copy) of at least a portion of the scene in which the user expressed interest. In some embodiments, the user can save that scene to a local machine, or save a link that allows the user to go back and stream or otherwise access that content at a later time. In some cases, the user can have options 308 to share this scene with others. In one embodiment, the user can post the clip to a social networking site or other collection or grouping of content that is accessible by other users across at least one network. The user can also, or alternatively, be able to add the tagged content to a container or other electronic grouping that can be sent to specific users or devices. The interface can include various other options as well, such as an option 306 to add a comment to the tagged content before uploading or sharing the content.

Figure 4:
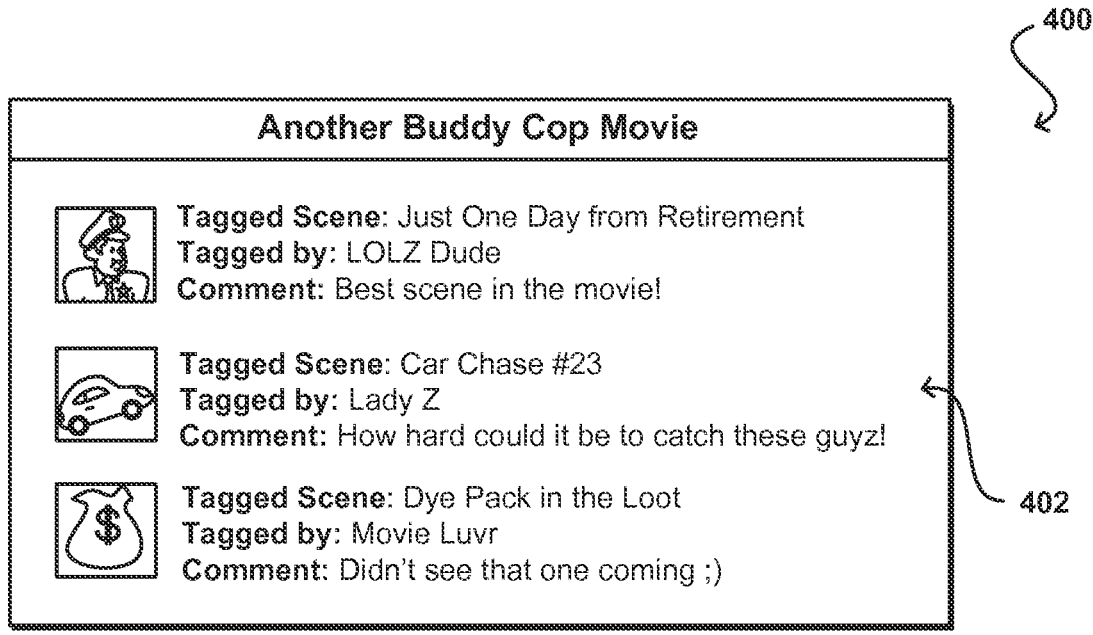
FIG. 4 illustrates an example display of scenes tagged for a movie in accordance with one embodiment.

FIG. 4 illustrates an example display 400 corresponding to a page of a social networking site, or other such page of content, in accordance with one embodiment. In this case, the page relates to a particular movie, where users can tag their favorite scenes and provide comments on those scenes. An entire virtual community or fan site can potentially be built around a particular movie, television show, etc., using tagged content and other information. One example community page can include links where the users can access specific scenes that were tagged by various users, as well as other related content. In addition to basic information about a movie, such as the title, location, and cast, the page can also include information about products shown in a scene, as well as links to Web sites about those products and/or that offer those products for sale. In some cases, the page also can include links to download or access specific scenes, videos, etc. If a user is a member of a site, the user might have the ability to download or purchase a full version of the content in a specific format.

The page can be a public page, where any user can post or comment, or can be a private page where only certain users can access, upload, comment, and/or otherwise interact with the content on the page. In some cases, any user can access the page and view the content, but must be registered in order to post. In some embodiments, users must be invited or approved before being able to view and/or post information. In some embodiments the videos posted will actually correspond to the videos captured by the users, while in other embodiments (at least for copyright reasons) the videos will be provided from a content provider (e.g., movie studio or other media provider) who can also provide advertising or other content that can help to generate revenue based on providing the content. In some embodiments, the videos are intended to be streamed by viewers through the site and not downloaded, whereby the videos might be viewed without a level of control by the provider. In some embodiments, links to advertising will be embedded in the media file itself, such that default advertising can be viewed at any time or place where the media file is being played. In some cases, the media file can work with the media player to attempt to locate current advertising, such as by sending an identifier or other information to an online ad provider or other such entity. Such an approach can enable the content provider to continually update advertising with the content in order to continually generate revenue. The number of contacts for ads also can indicate how popular a particular media file is with specific users, etc.

In other embodiments, the content collected and subsequently displayed via the interface is not provided by a Web page provided by a specific content provider, but instead corresponds to a virtual container (or other such grouping) of information that can be passed among various users, such as friends on a social networking site or peers of a peer network groups. In some embodiments, a user can send a copy of the container to each friend or peer associated with a container each time an update is made. In other embodiments, each friend or peer will store a local copy of the container, or at least a specific amount of information for the container (e.g., might not store copies of each video but a link to obtain each video), and only updated information (e.g., delta information) will be sent to the other friends or peers. In some cases, a state or other identifier will be used that can be attached to various messages sent throughout a group, such that if a particular user or device does not have the latest version of the container information, that user or device can request the updated information. Various other approaches for updating and/or synchronizing data among various devices can be used as well, as known or subsequently developed in the art.

Figure 5:
FIG. 5 illustrates an example display of scenes tagged from various movies in accordance with one embodiment.

FIG. 5 illustrates another example display 500 that can be presented to users in accordance with one embodiment. In this example, the content 502 is not related to a particular movie, television show, musical artist, or other such entity, but instead allows users to add information relating to a particular topic, genre, or other type of information. In this example, users are able to add content relating to comedy scenes in movies. As should be understood, there can be any of a number of different types of content gathered and presented via such a display.

In one embodiments, users can join a group, subscribe to a page, or otherwise obtain access to the grouping of information. Certain users can have the ability to add content relating to the topic, rate various content, provide comments, and otherwise submit information for inclusion in the grouping. When a user views a match for a captured media file, as in FIG. 3, the user can have the ability to specify one or more pages, sites, containers, or other groupings to which to add the matching content. In some embodiments, the user can also have control over the type of information to be added, such as whether a video or audio clip is included (if available or authorized), how much identifying should be attached, etc. In some embodiments, the media information can include information (e.g., metadata or hyperlinks) that enable a user viewing the content to purchase a copy of the content from an appropriate location, such as an online retailer.

Figure 6:
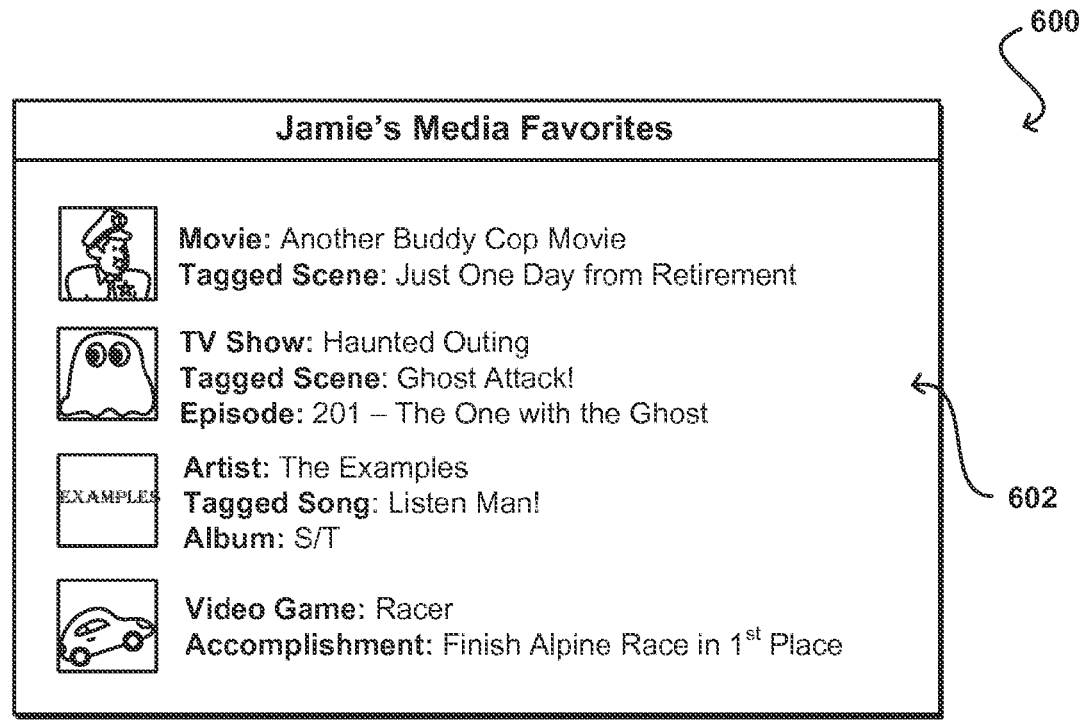
FIG. 6 illustrates an example display of various types of content that were tagged by a user in accordance with one embodiment.

FIG. 6 illustrates a display 600 for another type of grouping of content that can be used in accordance with various embodiments. In this example, various instances content 602 that were tagged by a particular user can be displayed together, such as on a personal page. The page can include any appropriate tagged content, such as movie, television, music, or gaming content. For example, each time a user tags a movie, song, commercial, or television show, the user can have the option of adding the content to the user's page.

If the user is playing a video game and beats a boss, reaches a certain level, finishes the game, or reaches another such point in the game, for example, the user can capture media such as the cut scene or theme music playing after reaching that point in the game, and can upload the match to the page in order to alert to others that the user reached that point in the game. In some cases, the user can also add comments, or have a screen capture or score information automatically added in order to prove the quality of game play by that user. Such an approach can be advantageous in at least some situations where achievements or other methods of recognitions are not included in a particular game or for a particular gaming console. By capturing the media and uploading to a specific site, for example, pages or groups can allow users to share their gaming accomplishments for existing games and/or consoles that do not otherwise provide such mechanisms. The ability to provide backwards compatibility with existing games and devices can enable providers to further extend the lifetime and revenue of existing components, and can help users to obtain more entertainment from these components. In some embodiments, users can capture similar information for arcade games, including vintage arcade games, and share feats with others across the globe.

In some embodiments, the user can keep the page private such that only the user can access the page. The page in this case can be a Web page with a password or other security mechanism, or can be a page stored locally on a computing device that is not accessible via a remote device. In some embodiments, the page can be accessible via devices over a network wherein users can subscribe to the page or otherwise have access (controlled or generally). In other embodiments, the information can be shared among peers on a peer network. Various other approaches can be used as well as should be apparent.

Figure 7:
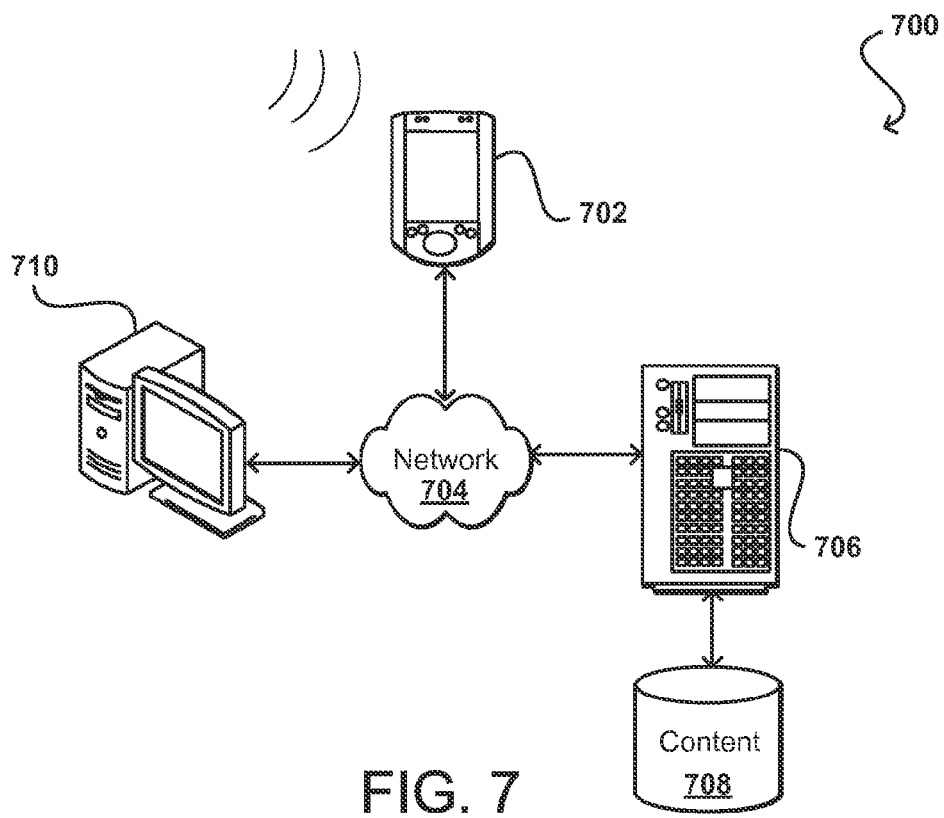
FIG. 7 illustrates a first example configuration for sharing tagged content that can be used in accordance with various embodiments.

FIG. 7 illustrates a first example configuration 700 wherein content tagged by a first user can be accessed by at least one additional user. In this example, a user of a first device 702 captures a media file and obtains matching information using one of the approaches discussed or suggested above. The user can cause the first device to submit information across at least one network 704, such as the Internet, to be received by at least one server 706 (e.g., Web server, data server, and/or application server) and stored in a database 708 for subsequent retrieval. The server(s) and database can be part of a content provider system, for example, that can enable users to access the information as part of a Web site or other such interface. Another user of a different client device 710 then can access the tagged and/or matched content and any related information by sending a request (e.g., an HTTP request) across the network 704 that is received by a server 706 able to access the content from the database 708 and provide the content for display on the second client device 710. Methods for requesting and serving content are well known in the art and will not be discussed in detail herein.

Figure 8:
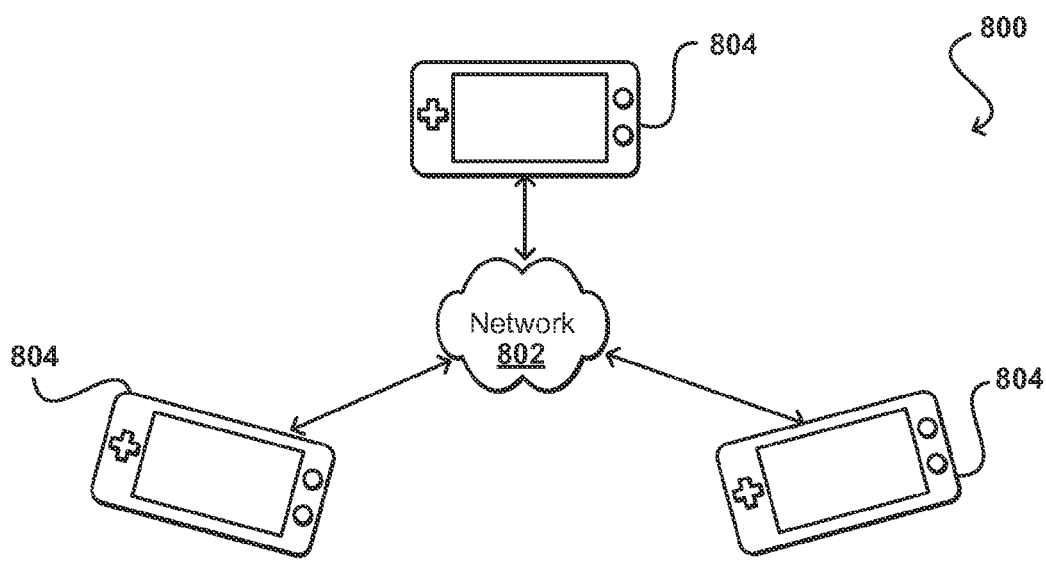
FIG. 8 illustrates a second example configuration for sharing tagged content that can be used in accordance with various embodiments.

FIG. 8 illustrates another example configuration 800, wherein peer devices 804 are able to share information over at least one network 802. Although the network in many cases will be the Internet or a proprietary communication network, in other embodiments the networking can be provided using direct communication between peer devices. For example, peer devices might exchange information when within a range of wireless communications of each other. Any of a number of other approaches to peer communication can be used as known or subsequently developed for such purposes.

In some embodiments, each peer can store a copy of a container or other grouping of content shared among peers. In other embodiments, each peer will store its own content, and other peers will request information from that peer. In still other embodiments, there can be a master peer that stores a master copy of the container, which includes at least a full listing of information added to the container by each peer, such that a peer wanting to access a piece of content can request identifying information from the master peer, which then will indicate the specific peer from which the content can be obtained. Various other storage and sharing approaches can be used as well.

Figure 9:
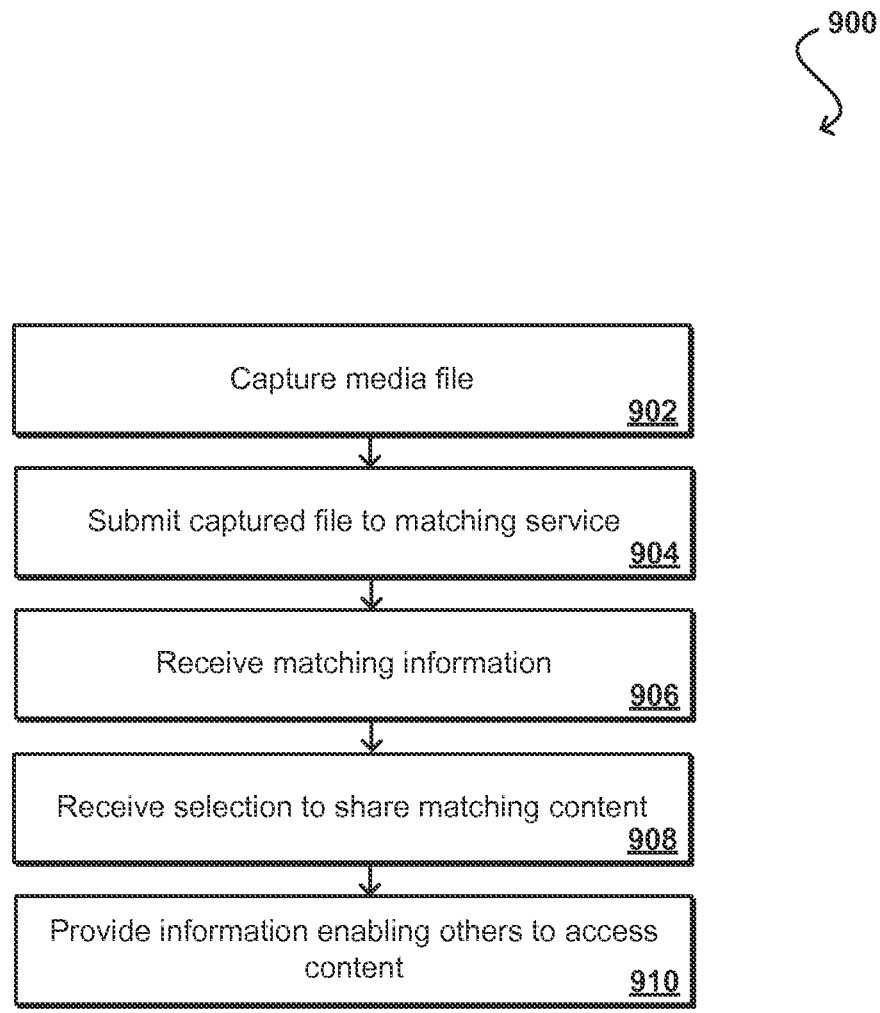
FIG. 9 illustrates an example process for tagging and sharing content that can be used in accordance with various embodiments.

FIG. 9 illustrates an example of a process 900 for sharing content with other users in accordance with one embodiment. In this example, a user records or otherwise captures at least a portion of content of interest 902, using any appropriate process discussed or suggested above. The user submits the content to a matching service 904, or other appropriate source or entity, and receives back information identifying matching content 906. The user, upon viewing the matching information, can select an option to share the content with others 908. Information relating to the content then can be sent from the user device to an appropriate location to enable other users (e.g., friends or peers) to view the information 910.

As discussed, in some cases the user might have captured content that included more than one instance of content, or have captured content just after a previous instance of content completed. For example, a user could have captured media that included the end of a scene of a movie, as well as the beginning of a commercial shown during that movie. In this case, the user can be presented with options identifying each match that was determined for a portion of the captured media file, and the user can select the content which was of interest to the user. In some embodiments, this selection can cause another request to be sent to the matching system or service, which can provide more detailed information or content corresponding to the user selection. Various other types of screens, inputs, and content can be provided or utilized within the scope of the various embodiments as should be apparent to one of ordinary skill in the art in light of the teachings and suggestions contained herein.

In some embodiments, the system can store or otherwise access information relating to previously-matched content for other users to assist in determining matching content. For example, an uploaded scene of a particular actor might potentially match more than one episode of a television series. In some cases, the system can look to scenes that were tagged by other users as an indication of the likelihood that a particular scene matches a user's selection. In one example, a user might capture audio of a scene where the quality of the audio is insufficient to match any particular scene within at least a threshold range of confidence. If there are three potential matches, and a vast majority of users have previously tagged one of those scenes, then this can be at least partially indicative that the popular scene is more likely to match the scene tagged by the user. In some cases the system might present the user with all three matches, and can rank the options based at least in part upon how often each scene was tagged by, viewed, or otherwise accessed by other users.

Collecting popularity information based on content tagging can also be beneficial for a number of other applications. For example, a television studio can monitor how often each guest star's scenes are tagged to determine the popularity of each star. Advertisers can monitor the popularity of certain commercials to determine the popularity of a particular advertising campaign. In some cases, other information such as the channel and time from which an advertisement was captured can provide valuable information to an advertiser attempting to determine how to best spend advertising revenue.

In some embodiments, the popularity information can be collected and analyzed. Various sources then can request specific reports, statistics, or other information from the provider. Such an approach can provide a source of revenue that can help in obtaining the rights for content provided to users. In some cases, the information can be tied to profiles of specific users, such that the statistics can contain generic information such as popularity by gender or age group. Various other such aspects can be analyzed and included as well as should be apparent.

As discussed above, it can be the case that a user will occasionally miss the intended content when attempting to capture media because the user is not able to get to the capture device quickly enough. In some embodiments, the device capturing the media segment can be configured to continually capture, sample, or record a signal (audio and/or video) around the device, or contained in a broadcast for directly connected devices. The device can cache or store a loop of recently recorded information, such as was captured over the last 10-20 seconds or another appropriate period of time. After that period of time, the data is discarded such that only data for the most recent period of time (e.g., the most recent 10 seconds of data at any time) will be stored on the device. The data cache acts like a "sliding window" with respect to time, where the window is configured to represent the most recent period of data, and the data corresponding to the window is continually updated (the window "slides" forward with respect to time) in order to represent the most recent data. Since a user will almost always activate the capture after an item of interest has been broadcast, caching or otherwise temporarily storing the content over a period of time just prior to the activation can be likely to include at least a portion of the content that was of interest to the user.

In one embodiment, a user is able to press a button or otherwise signal interest in the media, which essentially causes the device to capture a snapshot of the data currently represented by the sliding window and stored in the corresponding buffer or cache. In some embodiments, data for a period of time after the users presses the button (or otherwise signals interest) is also captured, such that a total window of interest is generated that includes data in the buffer extending backwards in time per the sliding window, as well as a few seconds of data subsequent to the time of the user action. The total window of interest thus surrounds the time of the user's action (e.g., hitting a button) to include data from before and after the action. The data in the total window of interest can be combined with at least one timestamp corresponding to the time of user action. This data can then be sent to a server or analyzed as described elsewhere in the draft. If the user expresses an interest in some advertisement or product placement in the broadcast stream, as based at least in part upon the timestamp, an appropriate module of the user device can cause information for the recorded audio, as well as the corresponding timestamp, to be transmitted to the matching service.

In an embodiment with a connected device such as a gaming console, the gaming console can continually record information being broadcast over one or more stations, such as a currently viewed station, and pre-buffer or otherwise store a constantly updating recently-broadcast period of information. The user can activate a capture or matching process by selecting or otherwise performing an input action, such as by pressing a button on a gaming controller or selecting an input on a remote controller, etc. The gaming console can be connected to a network such as the Internet, and can send a hash (or other representation of the recording) to the matching service. As mentioned, the matching service typically will have been primed with the fingerprints of the audio for certain programming, advertisements, and product placements, for example, and can attempt to locate a match. As mentioned, the timestamp can be used to assist in matching content where the service has access to various broadcast feeds and the media was captured from a broadcast feed. If multiple media segments are included within the captured time period, the user can receive information for each or an option to select to receive information for at least one of those segments. In this example where the gaming console is connected to the network, the supplemental content can be pushed onto the console in some embodiments for current display or subsequent retrieval, etc.

In some embodiments, the user can have an application (e.g., an "app") stored on a computing device, such as a smart phone or portable media player, that is able to direct the capture of audio and/or video information, or at least access captured media information, and analyze at least a portion of the media information such that the user device does not have to upload large amounts of data to a central server or other such location. Further, use of such an application can enable a user to set preferences or specify other such information that can be used to determine information such as the types of information to retrieve, devices to receive the supplemental content, and other such aspects.

Figure 10:
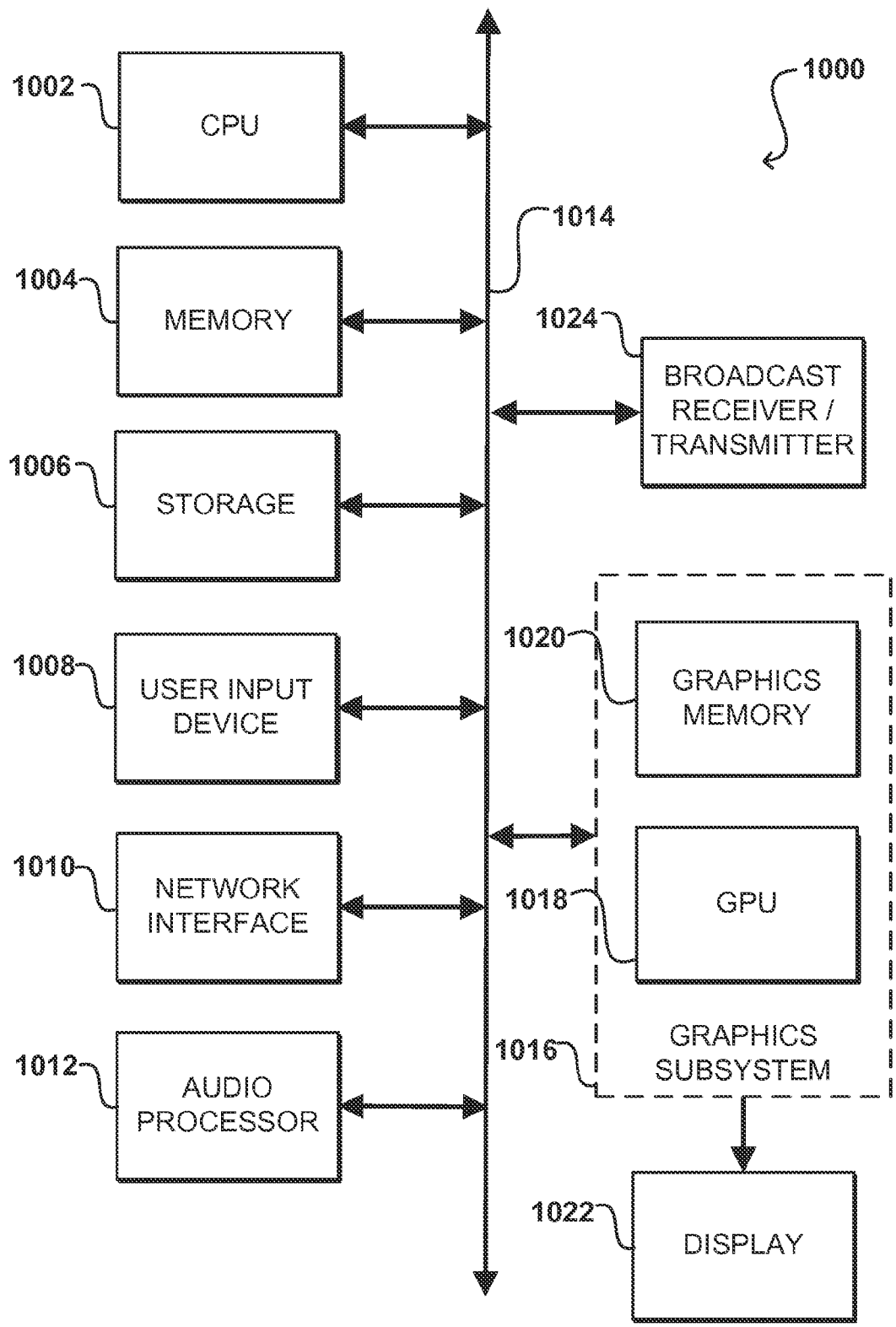
FIG. 10 illustrates components of an example device that can be used to perform aspects of the various embodiments.

FIG. 10 illustrates an exemplary hardware system suitable for implementing a device in accordance with one embodiment. This block diagram illustrates a computer system 1000, such as a personal computer, video game console, personal digital assistant, or other digital device, suitable for practicing an embodiment of the invention. Computer system 1000 includes a central processing unit (CPU) 1002 for running software applications and optionally an operating system. CPU 1002 may be comprised of one or more homogeneous or heterogeneous processing cores. Memory 1004 stores applications and data for use by the CPU 1002. Storage 1006 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 1008 communicate user inputs from one or more users to the computer system 1000, examples of which may include keyboards, mice, joysticks, touch pads, touch screens, still or video cameras, and/or microphones. Network interface 1010 allows computer system 1000 to communicate with other computer systems via an electronic communications network, and may include wired or wireless communication over local area networks and wide area networks such as the Internet. An audio processor 1012 is adapted to generate analog or digital audio output from instructions and/or data provided by the CPU 1002, memory 1004, and/or storage 1006. The components of computer system 1000, including CPU 1002, memory 1004, data storage 1006, user input devices 1008, network interface 1010, and audio processor 1012 are connected via one or more data buses 1022.

A graphics subsystem 1014 is further connected with data bus 1022 and the components of the computer system 1000. The graphics subsystem 1014 includes a graphics processing unit (GPU) 1016 and graphics memory 1018. Graphics memory 1018 includes a display memory (e.g., a frame buffer) used for storing pixel data for each pixel of an output image. Graphics memory 1018 can be integrated in the same device as GPU 1016, connected as a separate device with GPU 1016, and/or implemented within memory 1004. Pixel data can be provided to graphics memory 1018 directly from the CPU 1002. Alternatively, CPU 1002 provides the GPU 1016 with data and/or instructions defining the desired output images, from which the GPU 1016 generates the pixel data of one or more output images. The data and/or instructions defining the desired output images can be stored in memory 1004 and/or graphics memory 1018. In an embodiment, the GPU 1016 includes 3D rendering capabilities for generating pixel data for output images from instructions and data defining the geometry, lighting, shading, texturing, motion, and/or camera parameters for a scene. The GPU 1016 can further include one or more programmable execution units capable of executing shader programs.

The graphics subsystem 1014 periodically outputs pixel data for an image from graphics memory 1018 to be displayed on display device 1020. Display device 1020 can be any device capable of displaying visual information in response to a signal from the computer system 1000, including CRT, LCD, plasma, and OLED displays. Computer system 1000 can provide the display device 1020 with an analog or digital signal.

In accordance with various embodiments, CPU 1002 is one or more general-purpose microprocessors having one or more processing cores. Further embodiments can be implemented using one or more CPUs with microprocessor architectures specifically adapted for highly parallel and computationally intensive applications, such as media and interactive entertainment applications.

Further embodiments can be envisioned to one of ordinary skill in the art from the specification and figures. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
    receiving a matching request including information corresponding to a captured media file, the captured media file including at least one of audio and video data recorded from a media presentation by a user device and including at least one of an advertisement or a link to an advertisement;
    comparing, using at least one processing device, the captured media file information to stored instances of media data to attempt to locate a match for the captured media file information, at least a portion of the instances of stored media data corresponding to identified video content;
    locating a match of the captured media file information with one of the instances of stored media data;
    determining, using at least one processing device, supplemental information corresponding to the advertisement or the link to the advertisement included in the captured media file; and
    enabling the user to provide the supplemental information to other users using at least one content sharing mechanism.

2. The computer-implemented method of claim 1, wherein the other users include advertisers.

3. The computer-implemented method of claim 1, wherein the supplemental information includes popularity information related to the advertisement or link to the advertisement.

4. The computer-implemented method of claim 3, wherein the popularity information is determined based on a number of contacts for the advertisement or the link to the advertisement.

5. The computer-implemented method of claim 3, wherein the popularity information can be tied to profiles of specific users.

6. The computer-implemented method of claim 3 further comprising analyzing the popularity information to generate statistics concerning the popularity information.

7. The computer-implemented method of claim 6 further comprising updating the advertisement or the link to the advertisement based on the generated statistics.

8. The computer-implemented method of claim 7, wherein updating the advertisement or the link to the advertisement is initiated by the user device sending an identifier or other information to an advertisement provider.

9. The computer-implemented method of claim 1, wherein the supplemental information further includes a channel and a time from which the advertisement was captured.

10. The computer-implemented method of claim 1, wherein locating a match includes using previously determined popularity information.

11. A system, comprising:
    at least one processor; and
    memory including instructions that, when executed by the processor, cause the system to:
    receive a matching request including information corresponding to a captured media file, the captured media file including at least one of audio and video data recorded from a media presentation by a user device and including at least one of an advertisement or a link to an advertisement;
    compare, using at least one processing device, the captured media file information to stored instances of media data to attempt to locate a match for the captured media file information, at least a portion of the instances of stored media data corresponding to identified video content;
    locate a match of the captured media file information with one of the instances of stored media data;
    determine, using at least one processing device, supplemental information corresponding to the advertisement or the link to the advertisement included in the captured media file; and
    enable the user to provide the supplemental information to other users using at least one content sharing mechanism.

12. The system of claim 11, wherein the other users include advertisers.

13. The system of claim 11, wherein the supplemental information includes popularity information related to the advertisement or the link to the advertisement.

14. The system of claim 13, wherein the popularity information is determined based on a number of contacts for the advertisement or the link to the advertisement.

15. The system of claim 13, wherein the popularity information can be tied to profiles of specific users.

16. The system of claim 13 further comprising analyzing the popularity information to generate statistics concerning the popularity information.

17. The system of claim 16 further comprising updating the advertisement or the link to the advertisement based on the generated statistics.

18. The system of claim 17, wherein updating the advertisement or the link to the advertisement is initiated by the user device sending an identifier or other information to an advertisement provider.

19. The system of claim 11, wherein the supplemental information further includes a channel and a time from which the advertisement was captured.

20. A non-transitory computer-readable storage medium including instructions, the instructions when executed by at least one processor causing the at least one processor to:
- receive a matching request including information corresponding to a captured media file, the captured media file including at least one of audio and video data recorded from a media presentation by a user device and including at least one of an advertisement or a link to an advertisement;
- compare, using at least one processing device, the captured media file information to stored instances of media data to attempt to locate a match for the captured media file information, at least a portion of the instances of stored media data corresponding to identified video content;
- locate a match of the captured media file information with one of the instances of stored media data;
- determine, using at least one processing device, supplemental information corresponding to the advertisement or the link to the advertisement included in the captured media file; and
- enable the user to provide the supplemental information to other users using at least one content sharing mechanism.

* * * * *